(12) United States Patent
Choi et al.

(10) Patent No.: US 12,447,818 B2
(45) Date of Patent: Oct. 21, 2025

(54) AUTOMOTIVE HYDROGEN STORAGE TANK SUPPORT SYSTEM

(71) Applicants: HYUNDAI MOTOR COMPANY, Seoul (KR); Kia Corporation, Seoul (KR)

(72) Inventors: Ji Ho Choi, Hwaseong-si (KR); Seung Won An, Seoul (KR); Jong Seop Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 642 days.

(21) Appl. No.: 17/889,059

(22) Filed: Aug. 16, 2022

(65) Prior Publication Data

US 2023/0173914 A1 Jun. 8, 2023

(30) Foreign Application Priority Data

Dec. 8, 2021 (KR) .................. 10-2021-0174904

(51) Int. Cl.
| | |
|---|---|
| *B60K 15/07* | (2006.01) |
| *B60K 15/03* | (2006.01) |
| *B60N 2/015* | (2006.01) |
| *B60N 2/06* | (2006.01) |
| *B62D 25/20* | (2006.01) |
| *B62D 27/00* | (2006.01) |

(52) U.S. Cl.
CPC ............. *B60K 15/07* (2013.01); *B60N 2/015* (2013.01); *B62D 25/20* (2013.01); *B62D 27/00* (2013.01); *B60K 2015/03315* (2013.01); *B60N 2/06* (2013.01)

(58) Field of Classification Search
CPC .............. B60K 15/07; B60K 15/03006; B60K 2015/0634; B60K 2015/0675; B60K 2015/03315; B60Y 2306/01
USPC ........................................................ 280/834
See application file for complete search history.

(56) References Cited

U.S. PATENT DOCUMENTS

| | | | |
|---|---|---|---|
| 2006/0061081 A1* | 3/2006 | Kresse ................... | B60K 15/07 280/834 |
| 2014/0117716 A1* | 5/2014 | Patberg .................. | B62D 21/15 296/187.08 |

(Continued)

FOREIGN PATENT DOCUMENTS

| | | | | |
|---|---|---|---|---|
| CN | 204726513 U | * | 10/2015 | |
| DE | 102008051786 A1 | * | 4/2009 | ............... B60K 1/04 |
| KR | 2010042692 A | * | 4/2010 | |

*Primary Examiner* — Valentin Neacsu
*Assistant Examiner* — Tyler Jay Stanley
(74) *Attorney, Agent, or Firm* — MORGAN, LEWIS & BOCKIUS LLP

(57) ABSTRACT

An automotive hydrogen storage tank support system for a vehicle includes: a floor; a pair of side sills mounted on lateral edges of the floor, respectively; and a support frame mounted on the floor and supporting a hydrogen storage tank The support frame includes a pair of longitudinal members, and a plurality of transverse members connecting the pair of longitudinal members to each other, at least one transverse member among the plurality of transverse members has a pair of extension portions respectively extending from opposite ends thereof toward the pair of side sills, and each extension portion is joined to a corresponding side sill of the pair of side sills.

14 Claims, 11 Drawing Sheets

(56) References Cited

U.S. PATENT DOCUMENTS

2019/0276083 A1\* 9/2019 Saunders ................. B60K 1/04
2024/0344667 A1\* 10/2024 Baer ..................... F17C 13/084

\* cited by examiner

AUTOMOTIVE HYDROGEN STORAGE TANK SUPPORT SYSTEM

CROSS-REFERENCE TO RELATED APPLICATION

This application is based on and claims the benefit of priority to Korean Patent Application No. 10-2021-0174904, filed on Dec. 8, 2021 in the Korean Intellectual Property Office, the entire disclosure of which is incorporated herein by reference.

TECHNICAL FIELD

The present disclosure relates to an automotive hydrogen storage tank support system, and more particularly, to an automotive hydrogen storage tank support system significantly improving crashworthiness of the vehicle and safely protecting a hydrogen storage tank.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An FCEV includes a fuel cell stack in which electricity is produced using hydrogen, a hydrogen storage tank in which hydrogen is stored, and a battery pack in which electric energy generated by regenerative braking is stored.

The FCEV inevitably requires a large-capacity hydrogen storage tank in order to increase its all electric range (AER). In order to achieve an extended AER of the FCEV, the hydrogen storage tank may have a cylindrical shape extending in a width direction of the vehicle. However, when the length of the hydrogen storage tank increases in order to secure the sufficient capacity of the hydrogen storage tank, a side crash space between each end portion of the hydrogen storage tank and a corresponding side structure of a vehicle body may be relatively narrowed, which may increase a possibility of damage to the hydrogen storage tank during a side collision/impact of the vehicle.

Meanwhile, FCEVs are being applied to various types of vehicles such as sedans, sport utility vehicles (SUVs) and multi-purpose vehicles (MPVs). A vehicle such as MPV has relatively high overall height and floor height, and a step may be provided at each edge of the floor to facilitate loading or unloading of luggage and boarding or unboarding of passengers. The step may be recessed downwardly from the floor, and a side sill may be joined to a bottom end of the step. The side sill may be spaced apart from the floor in a height direction of the vehicle due to a height difference between the floor and the step. In the event of a vehicle collision/impact, the side sill may rotate toward the floor without being deformed by impact energy. Accordingly, the impact energy may not be absorbed on the side of the vehicle, so the crashworthiness of the vehicle may not be sufficiently achieved. The length of the hydrogen storage tank may be reduced to protect the hydrogen storage tank, and thus it may be difficult to secure the sufficient capacity of the hydrogen storage tank.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides an automotive hydrogen storage tank support system designed to directly connect a support frame supporting a hydrogen storage tank to side sills of a vehicle, thereby improving stiffness and strength of the vehicle, improving crashworthiness of the vehicle, and safely protecting the hydrogen storage tank in the event of a vehicle collision.

According to an aspect of the present disclosure, an automotive hydrogen storage tank support system for a vehicle may include: a floor; a pair of side sills mounted on lateral edges of the floor, respectively; and a support frame mounted on the floor and supporting a hydrogen storage tank. The support frame may include a pair of longitudinal members, and a plurality of transverse members connecting the pair of longitudinal members to each other. At least one transverse member among the plurality of transverse members may have a pair of extension portions respectively extending oppositely from opposite ends thereof toward the pair of side sills. Each extension portion may be joined to a corresponding side sill of the pair of side sills.

The extension portions of at least one transverse member may be joined to the corresponding side sills so that the support frame may be firmly joined to the pair of side sills, and thus the hydrogen storage tank may be firmly supported to a vehicle body. In particular, at least one transverse member may firmly support the pair of side sills in a width direction of the vehicle, thereby preventing deformation of the side sills and deformation of the vehicle body. Since the side sills may not hit the hydrogen storage tank, any damage to the hydrogen storage tank and valves and pipes connected thereto may be prevented.

Each side sill may include an inner side sill facing an interior of the vehicle, and an outer side sill facing an exterior of the vehicle. The pair of extension portions may be joined to the inner side sills, respectively.

Each extension portion may be joined to the corresponding inner side sill by a first mounting bolt being screwed into a first pipe nut that is fixed to the inner side sill.

As the extension portion of at least one transverse member is joined to the inner side sill of the side sill, strength and stiffness of the inner side sill itself may be increased, and accordingly the inner side sill may be a high-strength section. As the outer side sill of the side sill is not directly connected to the extension portion of the at least one transverse member, the outer side sill may be a low-strength section. That is, the side sill may be divided into the high-strength section and the low-strength section. During a side collision/impact of the vehicle, the outer side sill corresponding to the low-strength section of the side sill may be easily deformed by impact energy to thereby absorb the impact energy, and the inner side sill corresponding to the high-strength section of the side sill may be joined to the extension portion of the transverse member to thereby significantly prevent the deformation thereof, and thus damage to the hydrogen storage tank may be prevented.

Each side sill may further include a side sill reinforcement mounted in an inner cavity thereof, and at least a portion of the first pipe nut may be embedded in the side sill reinforcement.

As at least a portion of the first pipe nut is embedded in the side sill reinforcement, support stiffness of the first pipe nut may be significantly improved, and thus the extension portion of the transverse member may be more firmly joined to the side sill.

The automotive hydrogen storage tank support system may further include: a pair of floor longitudinal members attached to a bottom surface of the floor; and a plurality of floor crossmembers connecting the pair of floor longitudinal members to each other. Each floor longitudinal member may extend in a longitudinal direction of the vehicle, the pair of longitudinal members may be located between the pair of floor longitudinal members in a view from a direction perpendicular to the floor, and the pair of floor longitudinal members may be located between the pair of side sills in the view from the direction perpendicular to the floor.

Each longitudinal member may further include a mounting bracket extending toward a corresponding floor longitudinal member, and the mounting bracket may be joined to the corresponding floor longitudinal member.

The mounting bracket may be joined to the floor longitudinal member by a second mounting bolt being screwed into a second pipe nut that is mounted in an inner cavity of the floor longitudinal member.

As the longitudinal member of the support frame is firmly joined to the floor longitudinal member through the mounting bracket, the support frame may be firmly joined to the vehicle body. Thus, stiffness of the support frame supporting the hydrogen storage tank and stiffness and strength of the vehicle body may be improved.

The automotive hydrogen storage tank support system may further include a plurality of seat slide rails mounted on a top surface of the floor, and each longitudinal member may be vertically aligned with a corresponding seat slide rail of the plurality of seat slide rails.

The pair of longitudinal members may be joined to at least one floor crossmember among the plurality of floor crossmembers.

The automotive hydrogen storage tank support system may further include a third pipe nut mounted in an inner cavity of at least one floor crossmember, an upper bolt may extend through the seat slide rail, an external thread of the upper bolt may be screwed into an upper internal thread of the third pipe nut, a lower bolt may extend through the longitudinal member and the floor crossmember, and an external thread of the lower bolt may be screwed into a lower internal thread of the third pipe nut.

As described above, the longitudinal member may be mounted on the floor together with the seat slide rail through the floor crossmember, the third pipe nut, and the bolts so that the support frame may be very firmly mounted on the vehicle body, and thus the stiffness of the vehicle body may be significantly improved.

The plurality of transverse members may be aligned with some of the plurality of floor crossmembers.

The automotive hydrogen storage tank support system may further include a pair of center pillars mounted on lateral edges of the floor, respectively, and at least one transverse member among the plurality of transverse members may be aligned with the pair of center pillars.

The hydrogen storage tank may have a pair of mounting necks disposed on opposite end portions thereof, each longitudinal member may have a support block supporting a corresponding end portion of the hydrogen storage tank, and each support block may have a cavity in which a corresponding mounting neck of the hydrogen storage tank is received.

The plurality of transverse members may be connected to the pair of longitudinal members through a plurality of vertical members, and each vertical member may extend in a height direction of the vehicle.

The plurality of transverse members may be located below the pair of longitudinal members by a distance corresponding to a length of each vertical member.

The plurality of transverse members may include a first front transverse member which is closest to a front end of the vehicle, a second front transverse member which is spaced apart from the first front transverse member toward the rear of the vehicle, a first rear transverse member which is spaced apart from the second front transverse member toward the rear of the vehicle, and a second rear transverse member which is spaced apart from the first rear transverse member toward the rear of the vehicle.

The first front transverse member may be connected to the pair of longitudinal members through a pair of first front vertical members, the second front transverse member may be connected to the pair of longitudinal members through a pair of second front vertical members, the first rear transverse member may be connected to the pair of longitudinal members through a pair of first rear vertical members, and the second rear transverse member may be connected to the pair of longitudinal members through a pair of second rear vertical members.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
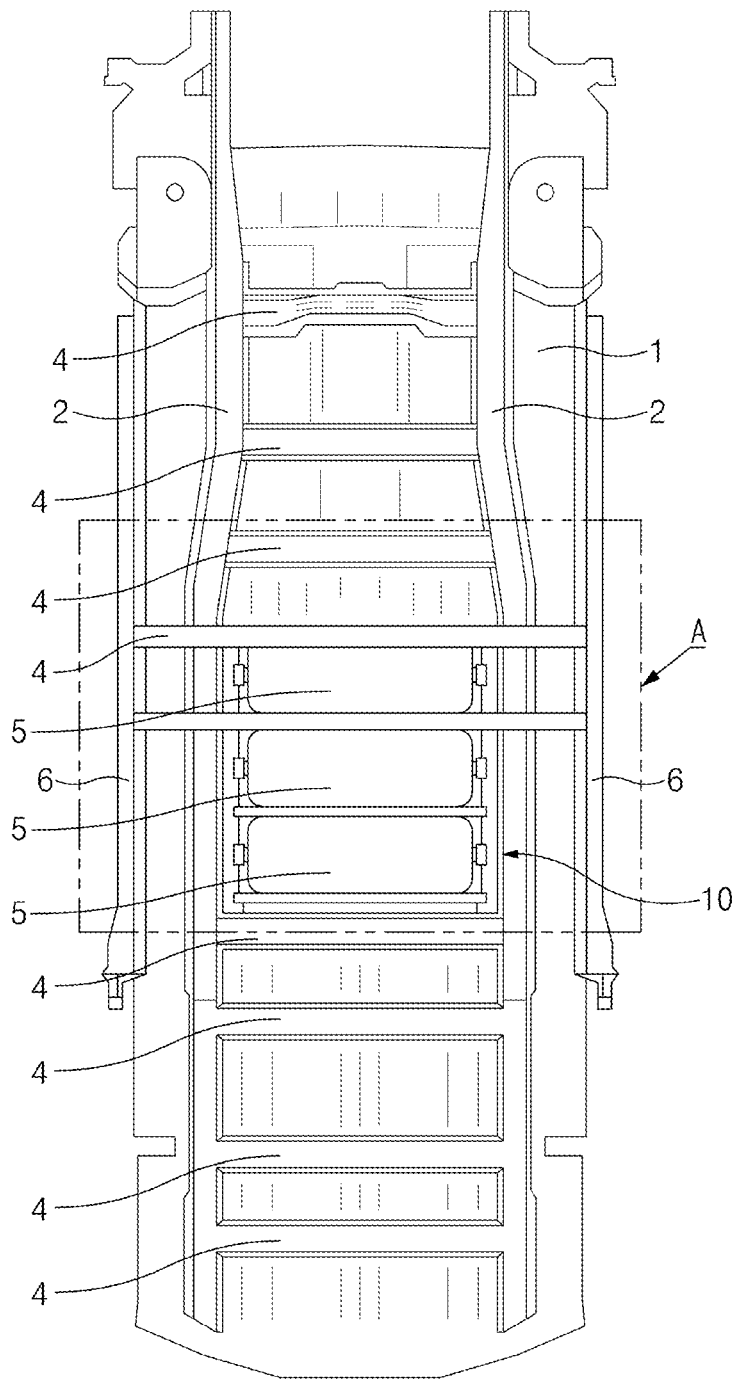
FIG. 1 illustrates a bottom view of an automotive hydrogen storage tank support system according to an exemplary embodiment of the present disclosure, which is mounted on a bottom surface of a floor of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an automotive hydrogen storage tank support system for a vehicle according to an exemplary embodiment of the present disclosure may include a floor 1 disposed on the bottom of a vehicle body 100, and a support frame 10 mounted on the floor 1, respectively.

Referring to FIG. 1, the floor 1 may be flat throughout the entirety of the bottom of the vehicle. A pair of floor longitudinal members 2 may be attached to a bottom surface of the floor 1 using fasteners, welding, and/or the like, and the pair of floor longitudinal members 2 may be spaced apart from each other in a width direction of the vehicle. Each floor longitudinal member 2 may extend in a longitudinal direction of the vehicle. A plurality of floor crossmembers 4 may be attached to the bottom surface of the floor 1 using fasteners, welding, and/or the like. The plurality of floor crossmembers 4 may be spaced apart from each other in the longitudinal direction of the vehicle, and each floor crossmember 4 may extend in the width direction of the vehicle. Opposite end portions of each floor crossmember 4 may be joined to the pair of floor longitudinal members 2 using fasteners, welding, and/or the like, respectively, and the plurality of floor crossmembers 4 may connect the pair of floor longitudinal members 2. Thus, the pair of floor longitudinal members 2 and the plurality of floor crossmembers 4 may form a ladder frame.

Referring to FIG. 1, a pair of side sills 6 may be attached to lateral edges of the floor 1, and each side sill 6 may extend in the longitudinal direction of the vehicle. The pair of floor longitudinal members 2 may be located between the pair of side sills 6 in a view from a direction perpendicular to the floor 1, each of the pair of floor longitudinal members 2 may be located closer to a longitudinal central axis of the vehicle than a corresponding one of the pair of side sills 6.

Figure 7:
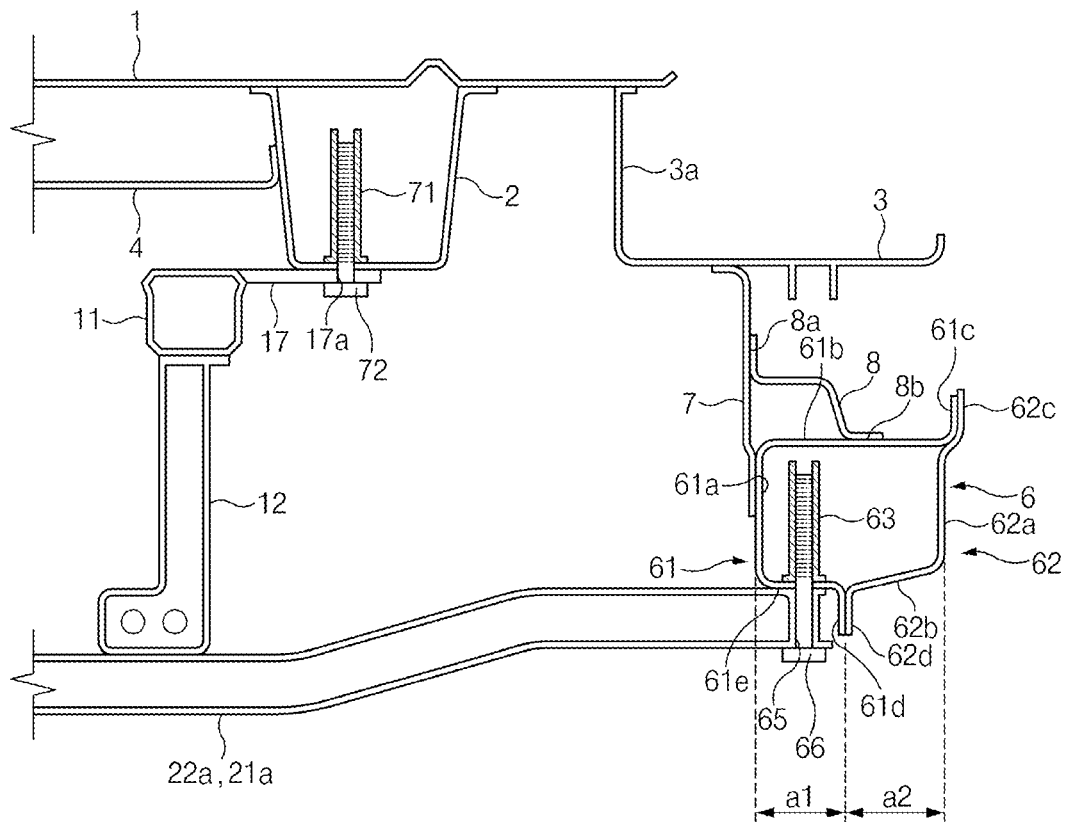
FIG. 7 illustrates a cross-sectional view, taken along line D-D of FIG. 4.

Referring to FIG. 7, a step 3 may be mounted on each edge of the floor 1, and the step 3 may be recessed downwardly from the edge of the floor 1. The step 3 may have a vertical wall 3a, and the vertical wall 3a of the step 3 may be fixed to the edge of the floor 1 using fasteners, welding, and/or the like. Each side sill 6 may be located below the step 3, and the side sill 6 may be connected to the step 3 through a connection member 7. That is, as the side sill 6 is located below the step 3, the side sill 6 may be located below the floor 1. The connection member 7 may extend vertically, and an inboard side wall 61a of an inner side sill 61 of each side sill 6 may be fixed to a lower portion of the connection member 7 using fasteners, welding, and/or the like. A reinforcing member 8 may connect the connection member 7 and the side sill 6, and the reinforcing member 8 may have a first flange 8a attached to the connection member 7, and a second flange 8b attached to the side sill 6. The first flange 8a may extend vertically to match the connection member 7, and the first flange 8a may be fixed to the connection member 7 using fasteners, welding, and/or the like. The second flange 8b may extend horizontally to match a top wall 61b of the inner side sill 61 of the side sill 6, and the second flange 8b may be fixed to the top wall 61b of the inner side sill 61 of the side sill 6 using fasteners, welding, and/or the like.

Figure 2:
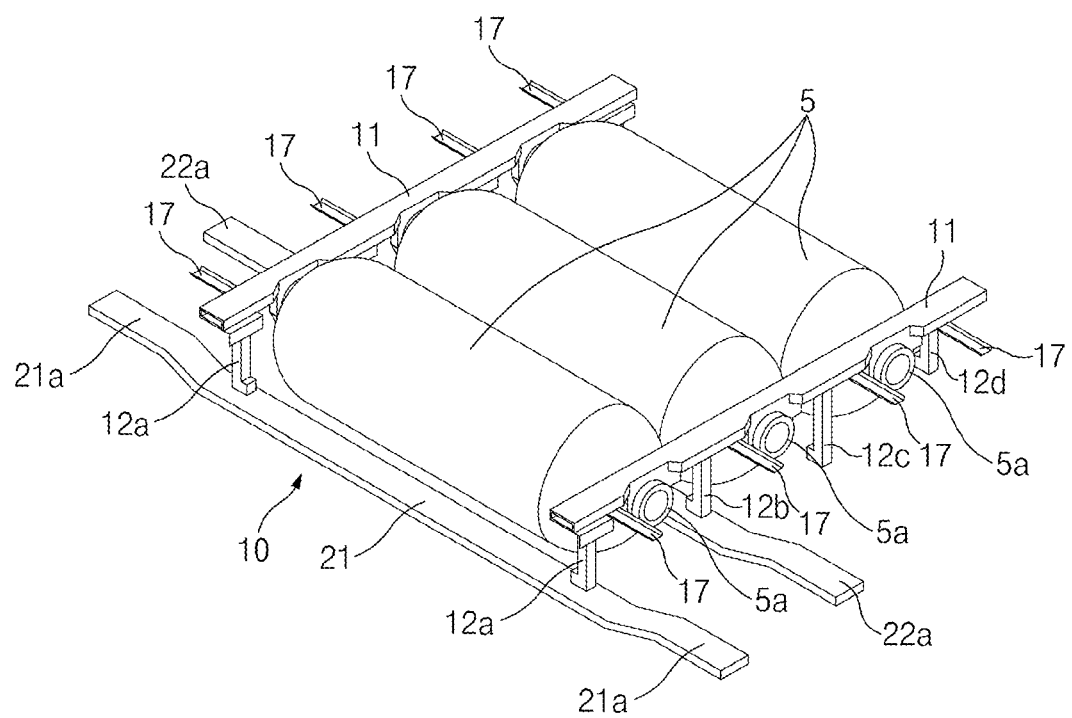
FIG. 2 illustrates a perspective view of a state in which hydrogen storage tanks are mounted on a support frame in an automotive hydrogen storage tank support system according to an exemplary embodiment of the present disclosure.

The support frame 10 may be disposed under the floor 1, and the support frame 10 may support one or more hydrogen storage tanks 5. Specifically, referring to FIGS. 2 to 4, the support frame 10 may include a pair of longitudinal members 11, and a plurality of transverse members 21, 22, 23, and 24 connecting the pair of longitudinal members 11 to each other.

Figure 3:
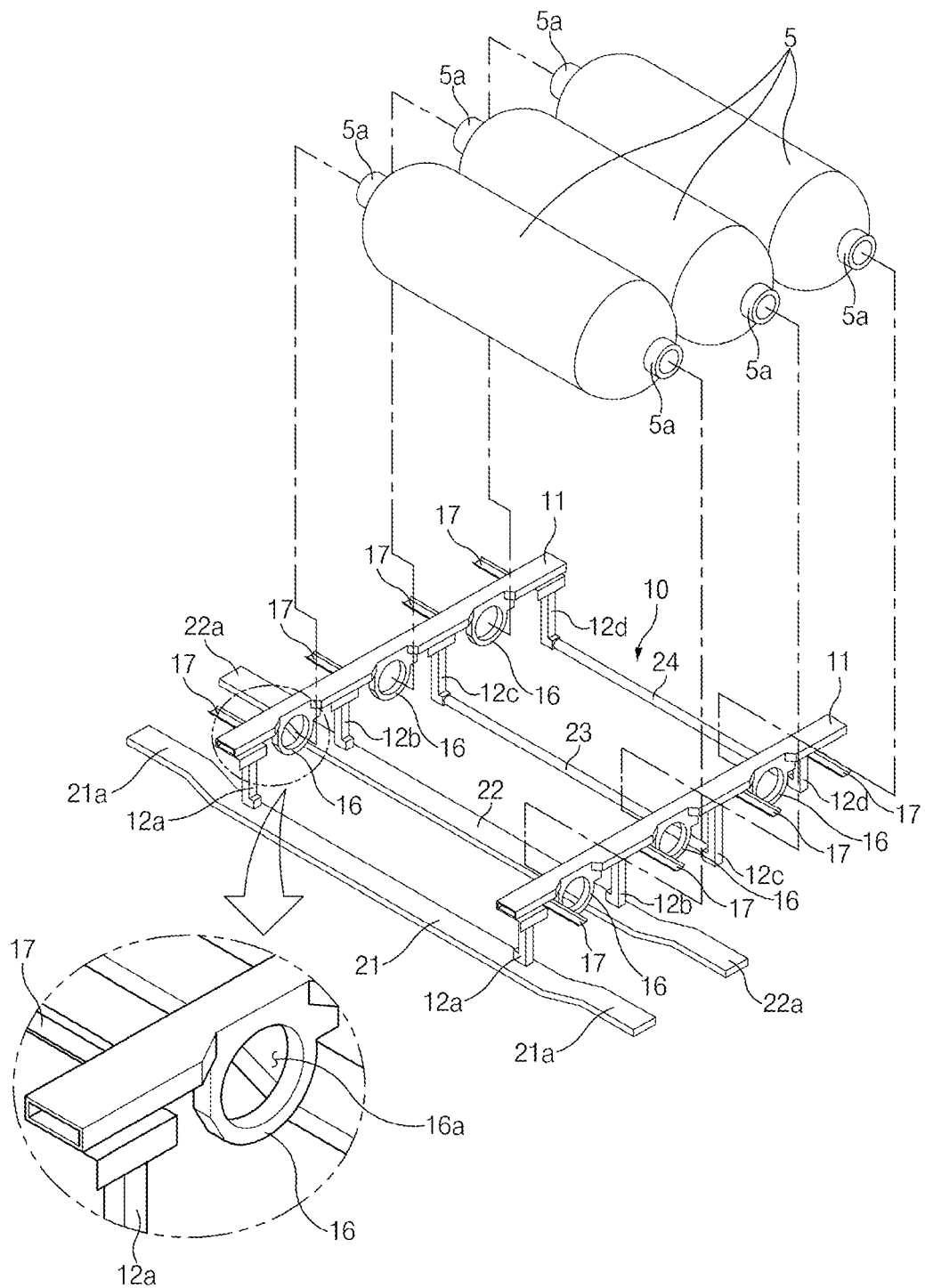
FIG. 3 illustrates an exploded perspective view of the hydrogen storage tanks and the support frame illustrated in FIG. 2.

Referring to FIG. 3, the hydrogen storage tank 5 may have a cylindrical shape extending in the width direction of the vehicle, and the hydrogen storage tank 5 may have a pair of mounting necks 5a provided on opposite end portions thereof. Each mounting neck 5a may have a cylindrical shape, and a diameter of the mounting neck 5a may be less than that of a cylindrical portion of the hydrogen storage tank 5.

Each longitudinal member 11 may extend in the longitudinal direction of the vehicle, and the pair of longitudinal members 11 may be spaced apart from each other in the width direction of the vehicle. Referring to FIG. 3, each longitudinal member 11 may have a support block 16 supporting each end portion of the hydrogen storage tank 5, and the plurality of support blocks 16 may be provided to each longitudinal member 11. The plurality of support blocks 16 may be spaced apart from each other in a longitudinal direction of the longitudinal member 11. Each support block 16 may protrude downwardly from the longitudinal member 11, and the support block 16 may have a cavity 16a. The mounting neck 5a of the hydrogen storage tank 5 may be received in the cavity 16a of the support block 16 so that the support block 16 may support a corresponding end portion of the hydrogen storage tank 5. In particular, the cavity 16a may have a shape matching that of the mounting neck 5a. According to an exemplary embodiment, the cavity 16a may have an inner diameter which is the same as an outer diameter of the mounting neck 5a. For example, when the support frame 10 supports three hydrogen storage tanks 5, each longitudinal member 11 may have three support blocks 16 to support the hydrogen storage tanks 5, respectively.

Figure 4:
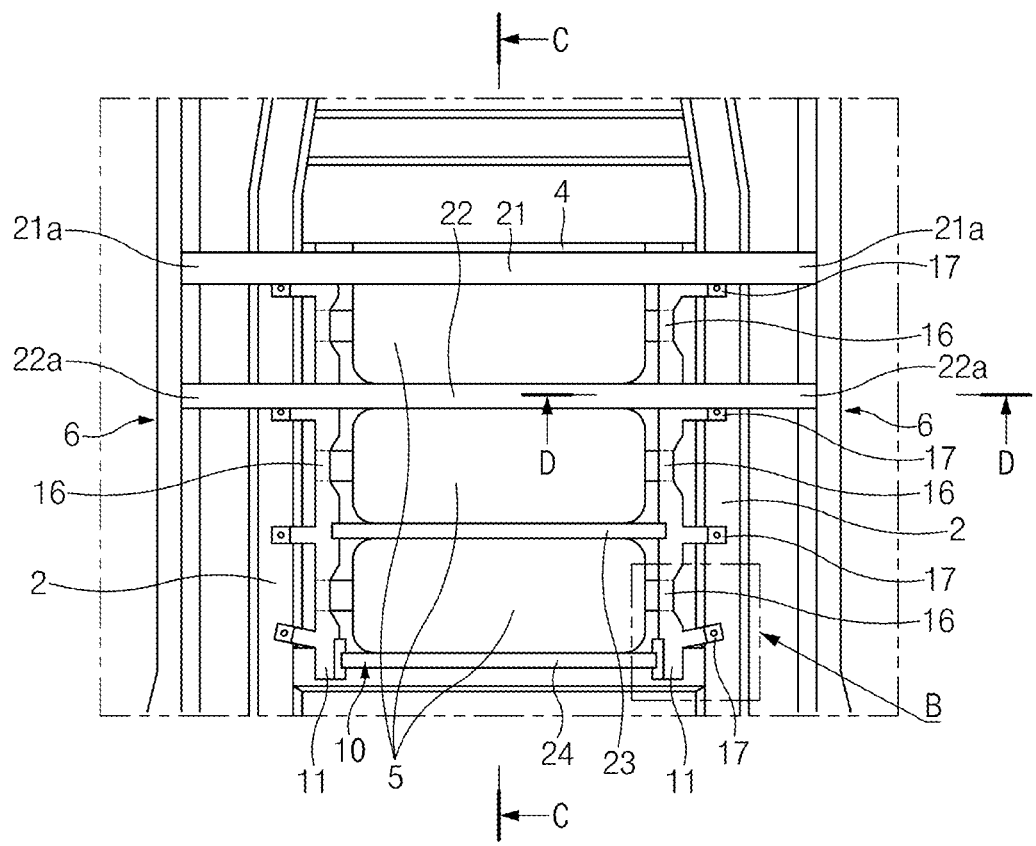
FIG. 4 illustrates an enlarged view of portion A of FIG. 1.

The number of the transverse members 21, 22, 23, and 24 may be one more than the number of the hydrogen storage tanks 5. Referring to FIGS. 3 and 4, when the support frame 10 supports three hydrogen storage tanks 5, the support frame 10 may have four transverse members 21, 22, 23, and 24. Accordingly, each of the hydrogen storage tanks 5 may be located between two adjacent transverse members of the transverse members 21, 22, 23, and 24.

The plurality of transverse members 21, 22, 23, and 24 may be connected to the pair of longitudinal members 11 through a plurality of vertical members 12a, 12b, 12c, and 12d, and each of the vertical members 12a, 12b, 12c, and 12d may extend in a height direction of the vehicle. Each pair of vertical members 12a, 12b, 12c, and 12d may connect the respective transverse members 21, 22, 23, and 24 to the pair of longitudinal members 11. The plurality of transverse members 21, 22, 23, and 24 may be located below the pair of longitudinal members 11 by a distance corresponding to a length of each vertical member 12.

At least one transverse member among the plurality of transverse members 21, 22, 23, and 24 may have a pair of extension portions respectively extending oppositely from the opposite ends, each pair of extension portions symmetrically extending toward the pair of side sills 6.

Referring to FIGS. 3 and 4, the plurality of transverse members 21, 22, 23, and 24 may include a first front transverse member 21, a second front transverse member 22, a first rear transverse member 23, and a second rear transverse member 24. The first front transverse member 21 may be closest to a front end of the vehicle, and the second front transverse member 22 may be spaced apart from the first front transverse member 21 toward the rear of the vehicle. The first rear transverse member 23 may be spaced apart from the second front transverse member 22 toward the rear of the vehicle, and the second rear transverse member 24 may be spaced apart from the first rear transverse member 23 toward the rear of the vehicle. The second rear transverse member 24 may be closest to a rear end of the vehicle.

The plurality of vertical members 12a, 12b, 12c, and 12d may include a pair of first front vertical members 12a connecting the first front transverse member 21 and the pair of longitudinal members 11, a pair of second front vertical members 12b connecting the second front transverse member 22 and the pair of longitudinal members 11, a pair of first rear vertical members 12c connecting the first rear transverse member 23 and the pair of longitudinal members 11, and a pair of second rear vertical members 12d connecting the second rear transverse member 24 and the pair of longitudinal members 11.

The pair of first front vertical members 12a may be spaced apart from each other by a distance corresponding to that between the pair of longitudinal members 11 in the width direction of the vehicle, and the pair of second front vertical members 12b may be spaced apart from each other by a distance corresponding to that between the pair of longitudinal members 11 in the width direction of the vehicle. The pair of first rear vertical members 12c may be spaced apart from each other by a distance corresponding to that between the pair of longitudinal members 11 in the width direction of the vehicle, and the pair of second rear vertical members 12d may be spaced apart from each other by a distance corresponding to that between the pair of longitudinal members 11 in the width direction of the vehicle.

A top end of each first front vertical member 12a may be directly fixed to a bottom surface of the corresponding longitudinal member 11 using fasteners, welding, and/or the like, and a bottom end of the first front vertical member 12a may be fixed to a top surface of the corresponding first front transverse member 21 using fasteners, welding, and/or the like. The first front transverse member 21 may be connected to the pair of longitudinal members 11 through the pair of first front vertical members 12a.

A top end of each second front vertical member 12b may be directly fixed to the bottom surface of the corresponding longitudinal member 11 using fasteners, welding, and/or the like, and a bottom end of the second front vertical member 12b may be fixed to a top surface of the corresponding second front transverse member 22 using fasteners, welding, and/or the like. The second front transverse member 22 may be connected to the pair of longitudinal members 11 through the pair of second front vertical members 12b.

A top end of each first rear vertical member 12c may be directly fixed to the bottom surface of the corresponding longitudinal member 11 using fasteners, welding, and/or the like, and a bottom end of the first rear vertical member 12c may be fixed to a top surface of the corresponding first rear transverse member 23 using fasteners, welding, and/or the like. The first rear transverse member 23 may be connected to the pair of longitudinal members 11 through the pair of first rear vertical members 12c.

A top end of each second rear vertical member 12d may be directly fixed to the bottom surface of the corresponding longitudinal member 11 using fasteners, welding, and/or the like, and a bottom end of the second rear vertical member 12d may be fixed to a top surface of the corresponding second rear transverse member 24 using fasteners, welding, and/or the like. The second rear transverse member 24 may be connected to the pair of longitudinal members 11 through the pair of second rear vertical members 12d.

Referring to FIGS. 3 and 4, the first front transverse member 21 may have the pair of first extension portions 21a extending oppositely from the pair of first front vertical members 12a to the pair of side sills 6. Referring to FIG. 4, an end portion of each first extension portion 21a may be fixed to the corresponding side sill 6 using fasteners, welding, and/or the like.

Referring to FIGS. 3 and 4, the second front transverse member 22 may have the pair of second extension portions 22a oppositely extending from the pair of second front vertical members 12b to the pair of side sills 6. Referring to FIG. 4, an end portion of each second extension portion 22a may be fixed to the corresponding side sill 6 using fasteners, welding, and/or the like.

The extension portions 21a and 22a of at least some transverse members 21 and 22 may be joined to the corresponding side sills 6 of the pair of side sills 6 so that the support frame 10 may be firmly joined to the pair of side sills 6, and thus the hydrogen storage tanks 5 may be firmly supported to the vehicle body 100. In particular, at least some transverse members 21 and 22 may firmly support the pair of side sills 6 in the width direction of the vehicle, thereby preventing deformation of the side sills 6 and deformation of the vehicle body 100. Since the side sills 6 may not hit the hydrogen storage tanks 5, any damage to the hydrogen storage tanks 5 and valves and pipes connected thereto may be prevented.

As the first front transverse member 21 and the second front transverse member 22 are close to the front of the vehicle, they may be located directly below a driver's seat in a passenger compartment of the vehicle. Accordingly, the first extension portions 21a of the first front transverse member 21 and the second extension portions 22a of the second front transverse member 22 may be joined to the pair of side sills 6 so that the safety of the driver's seat may be significantly improved.

Figure 6:
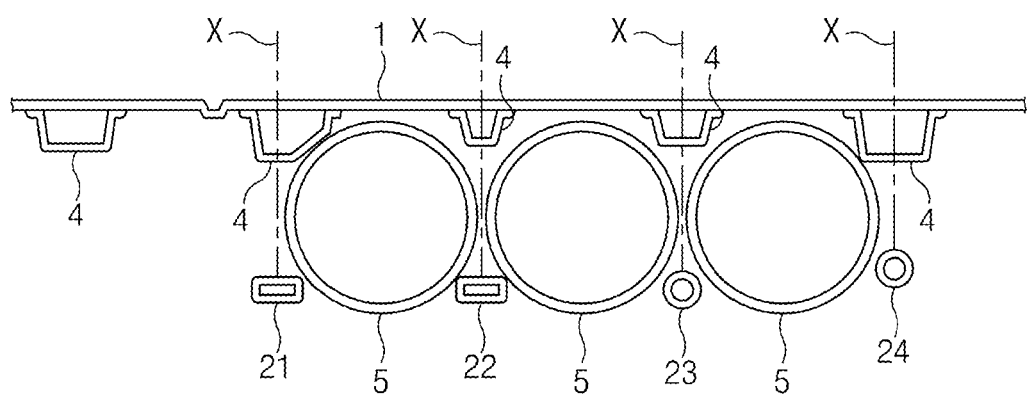
FIG. 6 illustrates a cross-sectional view, taken along line C-C of FIG. 4.

Referring to FIG. 6, the plurality of transverse members 21, 22, 23, and 24 may be aligned with some of the plurality of floor crossmembers 4 along vertical axes X, respectively. For example, the first front transverse member 21 may be aligned with the floor crossmember 4 located above the first front transverse member 21, the second front transverse member 22 may be aligned with the floor crossmember 4 located above the second front transverse member 22, the first rear transverse member 23 may be aligned with the floor crossmember 4 located above the first rear transverse member 23, the second rear transverse member 24 may be aligned with the floor crossmember 4 located above the second rear transverse member 24.

Figure 8:
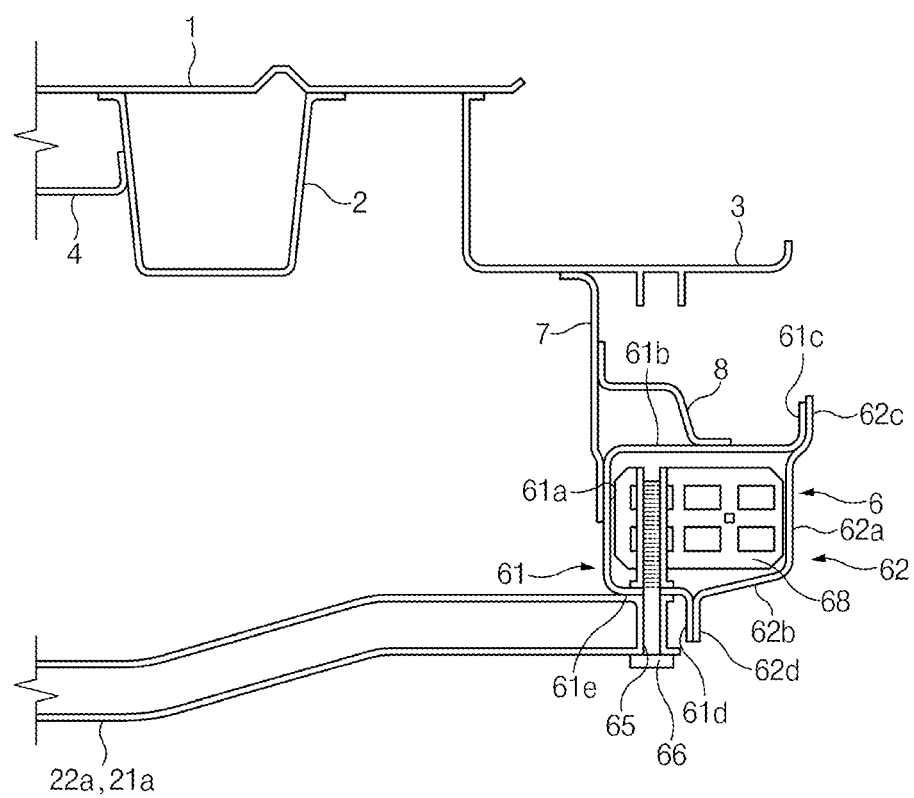
FIG. 8 illustrates a modification to the exemplary embodiment illustrated in FIG. 7.

As illustrated in FIGS. 7 and 8, when a fuel cell electric vehicle (FCEV) is applied to a multi-purpose vehicle (MPV), a height of the side sill 6 is less than that of the floor 1. During a side collision/impact of the vehicle, when an impact load is applied to the side sill 6, the side sill 6 may rotate or pivot with respect to each edge of the floor 1 due to a moment acting on the edge of the floor 1. The extension portions 21a and 22a of some transverse members 21 and 22 of the support frame 10 may be directly joined to the corresponding side sills 6, thereby stably supporting the side sills 6 in the width direction of the vehicle, and thus reliably preventing damages to the hydrogen storage tanks 5 and the valves, pipes, and the like connected thereto.

Referring to FIG. 3, the pair of first rear vertical members 12c may be respectively fixed to opposite end portions of the first rear transverse member 23, and the pair of second rear vertical members 12d may be respectively fixed to opposite end portions of the second rear transverse member 24.

Referring to FIG. 4, the distance between the pair of longitudinal members 11 may be less than that between the pair of floor longitudinal members 2, and accordingly the pair of longitudinal members 11 may be located between the pair of floor longitudinal members 2 in the view from the direction perpendicular to the floor 1, each one of the pair of longitudinal members 11 may be located closer to the longitudinal central axis of the vehicle than a corresponding one of the pair of floor longitudinal members 2.

Referring to FIG. 7, a first pipe nut 63 may be fixedly mounted in an inner cavity of each side sill 6, and a mounting hole 65 may be provided in an end portion of each of the extension portions 21a and 22a. The mounting hole 65 may be aligned with a threaded hole of the first pipe nut 63. A first mounting bolt 66 may extend through the mounting hole 65 of each of the extension portions 21a and 22a and the threaded hole of the first pipe nut 63. An external thread of the first mounting bolt 66 may be screwed into an internal thread of the first pipe nut 63 so that each of the extension portions 21a and 22a of the front transverse members 21 and 22 may be firmly joined to the corresponding side sill 6 through the first mounting bolt 66 and the first pipe nut 63.

Referring to FIG. 7, each side sill 6 may include the inner side sill 61 facing the interior of the vehicle, and an outer side sill 62 facing the exterior of the vehicle. The inner side sill 61 and the outer side sill 62 may define the inner cavity therebetween.

The inner side sill 61 may include the inboard side wall 61a facing the interior of the vehicle, the top wall 61b facing the top of the vehicle, and a bottom wall 61e facing the bottom of the vehicle. The inboard side wall 61a may extend vertically, the top wall 61b may extend horizontally from a top end of the inboard side wall 61a toward the exterior of the vehicle, and the bottom wall 61e may extend horizontally from a bottom end of the inboard side wall 61a toward the exterior of the vehicle. A top flange 61c may extend vertically and upwardly from the top wall 61b, and a bottom flange 61d may extend vertically and downwardly from the bottom wall 61e.

The outer side sill 62 may include an outboard side wall 62a facing the exterior of the vehicle, and a bottom wall 62b facing the bottom of the vehicle. The outboard side wall 62a may extend vertically, and the bottom wall 62b may extend horizontally from a bottom end of the outboard side wall 62a toward the interior of the vehicle. A top flange 62c may extend vertically and upwardly from a top end of the outboard side wall 62a, and a bottom flange 62d may extend vertically and downwardly from the bottom wall 62b.

The bottom flange 61d of the inner side sill 61 and the bottom flange 62d of the outer side sill 62 may be joined so that the bottom wall 61e of the inner side sill 61 may be horizontally aligned with the bottom wall 62b of the outer side sill 62. The top flange 61c of the inner side sill 61 and the top flange 62c of the outer side sill 62 may be joined so that the top wall 61b of the inner side sill 61 may be located above the bottom wall 61e of the inner side sill 61 and the bottom wall 62b of the outer side sill 62.

Referring to FIG. 7, the first pipe nut 63 may be fixedly mounted on the inner side sill 61, and the first pipe nut 63 may be fixed to the bottom wall 61e of the inner side sill 61. In particular, the first pipe nut 63 may be adjacent to the bottom flange 61d of the inner side sill 61. As the first pipe nut 63 is fixed to the inner side sill 61 of the side sill 6, the extension portions 21a and 22a of the front transverse members 21 and 22 may be joined to the inner side sill 61 of the corresponding side sill 6 through the first mounting bolt 66 and the first pipe nut 63. As the extension portions 21a and 22a of the front transverse members 21 and 22 are joined to the inner side sill 61 of the side sill 6, strength and stiffness of the inner side sill 61 itself may be increased, and accordingly the inner side sill 61 may be a high-strength section a1. As the outer side sill 62 of the side sill 6 is not directly connected to the extension portions 21a and 22a of the front transverse members 21 and 22, the outer side sill 62 may be a low-strength section a2. That is, the side sill 6 may be divided into the high-strength section a1 and the low-strength section a2 with respect to the first pipe nut 63 or the bottom flange 61d of the inner side sill 61. During a side collision/impact of the vehicle, the outer side sill 62 corresponding to the low-strength section a2 of the side sill 6 may be easily deformed by impact energy to thereby absorb the impact energy, and the inner side sill 61 corresponding to the high-strength section a1 of the side sill 6 may be joined to the extension portions 21a and 22a of the front transverse members 21 and 22 to thereby significantly prevent the deformation thereof, and thus damage to the hydrogen storage tanks 5 may be prevented.

Referring to FIG. 8, the side sill 6 may further include a side sill reinforcement 68 mounted in the inner cavity thereof. The side sill reinforcement 68 may be fixedly mounted in the inner cavity of the side sill 6 through a bracket (not shown) and the like. The side sill reinforcement 68 may extend in a longitudinal direction of the side sill 6. For example, the side sill reinforcement 68 may be an extruded product made of aluminum or an aluminum alloy. At least a portion of the first pipe nut 63 may be embedded in the side sill reinforcement 68. Accordingly, support stiffness of the first pipe nut 63 may be significantly improved, and thus each of the extension portions 21a and 22a of some transverse members 21 and 22 may be more firmly joined to the side sill 6.

Figure 5:
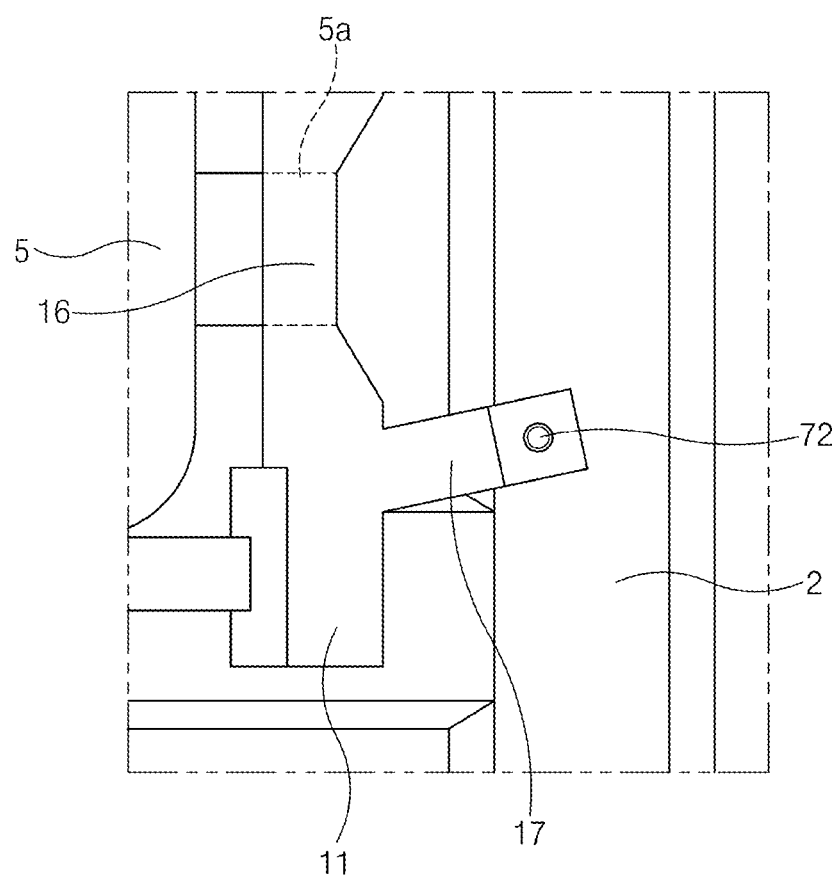
FIG. 5 illustrates an enlarged view of portion B of FIG. 4.

Referring to FIGS. 4 and 5, each longitudinal member 11 may further include a mounting bracket 17 extending from the longitudinal member 11 toward the floor longitudinal member 2 adjacent thereto, and the mounting bracket 17 may be joined to the corresponding floor longitudinal member 2. According to an exemplary embodiment, the mounting bracket 17 and the longitudinal member 11 may form a unitary one-piece structure.

According to an exemplary embodiment of the present disclosure, the plurality of mounting brackets 17 may extend from the longitudinal member 11 of the support frame 10 toward the floor longitudinal member 2 adjacent thereto.

Referring to FIG. 7, the mounting bracket 17 may have a mounting hole 17a, and a second pipe nut 71 may be fixedly mounted in an inner cavity of the floor longitudinal member 2. The mounting hole 17a of the mounting bracket 17 may be aligned with a threaded hole of the second pipe nut 71. A second mounting bolt 72 may extend through the mounting hole 17a of the mounting bracket 17 and the second pipe nut 71, and an external thread of the second mounting bolt 72 may be screwed into an internal thread of the second pipe nut 71 so that the mounting bracket 17 of the longitudinal member 11 may be firmly joined to the corresponding floor longitudinal member 2.

As described above, the pair of longitudinal members 11 may be joined to the pair of floor longitudinal members 2 through the plurality of mounting brackets 17 so that the support frame 10 may be firmly joined to the vehicle body 100. Thus, stiffness of the support frame 10 supporting the hydrogen storage tanks 5 and stiffness and strength of the vehicle body 100 may be improved.

Figure 9:
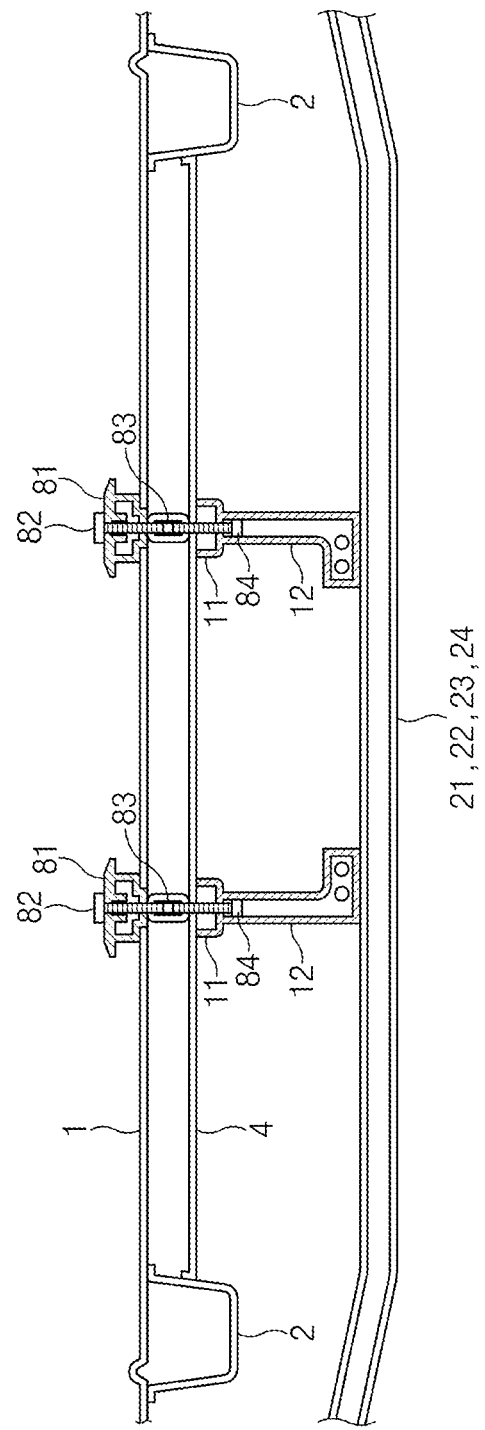
FIG. 9 illustrates an automotive hydrogen storage tank support system according to another exemplary embodiment of the present disclosure.

Referring to FIG. 9, a plurality of seat slide rails 81 may be mounted on a top surface of the floor 1, and the plurality of seat slide rails 81 may be configured to guide the movement of vehicle seats, and thus the positions of the vehicle seats may be adjusted. Each seat slide rail 81 may extend in the longitudinal direction of the vehicle. The pair of longitudinal members 11 may be aligned with two seat slide rails 81, respectively, and each longitudinal member 11 may be vertically aligned with the corresponding seat slide rail 81 of the plurality of seat slide rails 81.

The pair of longitudinal members 11 may be joined to at least some floor crossmembers 4 among the plurality of floor crossmembers 4 using fasteners, welding, and/or the like. Each of at least some floor crossmembers 4 may have a third pipe nut 83 fixedly mounted in an inner cavity thereof. An upper bolt 82 may extend through each seat slide rail 81, and an external thread of the upper bolt 82 may be screwed into an upper internal thread of the third pipe nut 83. That is, each seat slide rail 81 may be connected to some floor crossmembers 4 through the upper bolts 82 and the third pipe nuts 83. A lower bolt 84 may extend through the longitudinal member 11 and the floor crossmember 4, and an external thread of the lower bolt 84 may be screwed into a lower internal thread of the third pipe nut 83. That is, each longitudinal member 11 may be connected to some floor crossmembers 4 through the lower bolts 84 and the third pipe nuts 83. In particular, each longitudinal member 11 of the support frame 10 may be aligned with and connected to the corresponding seat slide rail 81 along a longitudinal axis of the third pipe nut 83.

As described above, the longitudinal members 11 may be mounted on the floor 1 together with the seat slide rails 81 through the floor crossmembers 4, the third pipe nuts 83, and the bolts 82 and 84 so that the support frame 10 may be very firmly mounted on the vehicle body 100, and thus the stiffness of the vehicle body 100 may be significantly improved.

Figure 10:
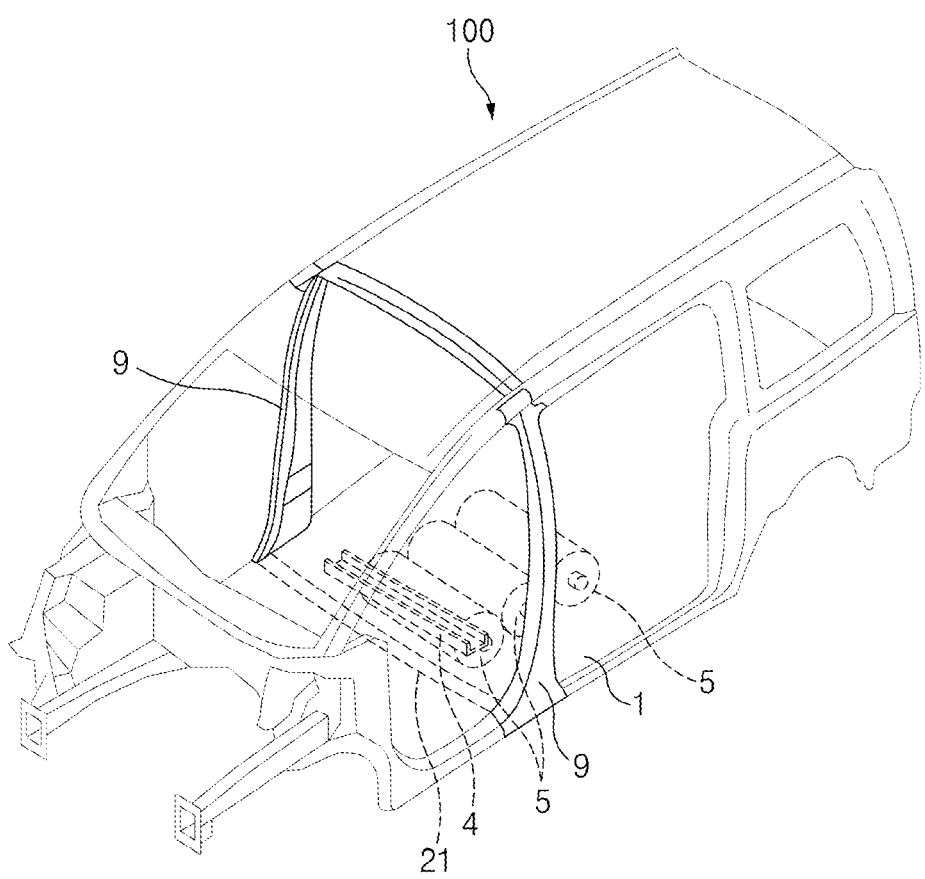
FIG. 10 illustrates an automotive hydrogen storage tank support system according to another exemplary embodiment of the present disclosure.
Figure 11:
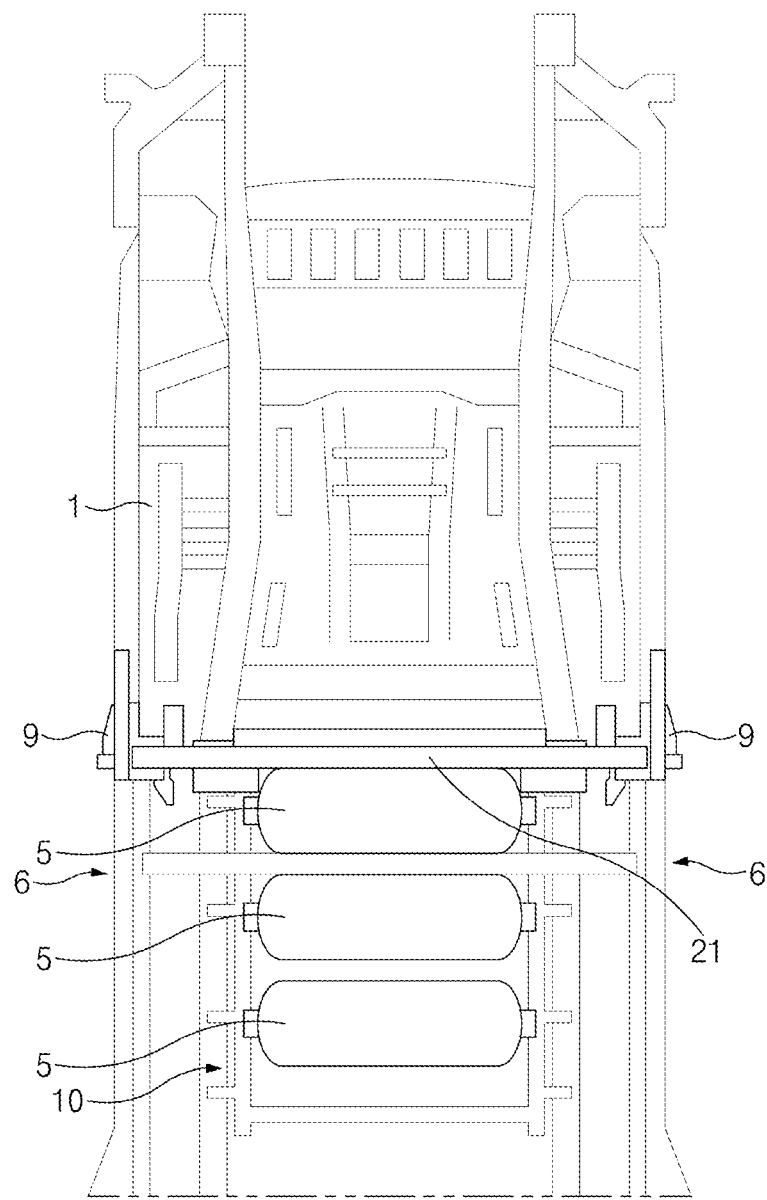
FIG. 11 illustrates a bottom view of a vehicle body illustrated in FIG. 10.

Referring to FIGS. 10 and 11, a pair of center pillars 9 may extend from lateral edges of the floor 1 in the height direction of the vehicle. At least one of the plurality of transverse members 21, 22, 23, and 24 may be aligned with the pair of center pillars 9. Specifically, the first front transverse member 21 may be aligned with the pair of center pillars 9, and the pair of first extension portions 21a may be joined to the pair of side sills 6, respectively, and accordingly the end portion of each first extension portion 21a may be aligned with a bottom end of the corresponding center pillar 9. As the first front transverse member 21 is aligned with the pair of center pillars 9, the floor crossmember 4 aligned with the first front transverse member 21 may also be aligned with the pair of center pillars 9. As the first front transverse member 21 is aligned with the pair of center pillars 9, the support frame 10 may form a loop structure with the center pillars 9 of the vehicle body 100, and thus the stiffness of the vehicle body 100 may be significantly improved.

As set forth above, according to exemplary embodiments of the present disclosure, the support frame supporting the hydrogen storage tanks may be directly connected to the side sills of the vehicle, thereby improving the stiffness and strength of the vehicle, improving the crashworthiness of the vehicle, and safely protecting the hydrogen storage tanks in the event of a vehicle collision.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An automotive hydrogen storage tank support system for a vehicle, comprising:
a floor;
a pair of side sills mounted on lateral edges of the floor, respectively;
a support frame mounted on the floor, and configured to support a hydrogen storage tank;
a pair of floor longitudinal members attached to a bottom surface of the floor; and
a plurality of floor crossmembers connecting the pair of floor longitudinal members to each other; and
a plurality of seat slide rails mounted on a top surface of the floor,
wherein the support frame includes a pair of longitudinal members, and a plurality of transverse members connecting the pair of longitudinal members to each other,
at least one transverse member among the plurality of transverse members has a pair of extension portions respectively extending oppositely from opposite ends thereof toward the pair of side sills,
each extension portion is joined to a corresponding side sill of the pair of side sills,
the pair of longitudinal members are joined to at least one floor crossmember among the plurality of floor crossmembers,
a pipe nut is mounted in an inner cavity of the at least one floor crossmember,
an upper bolt extends through the seat slide rail,
an external thread of the upper bolt is screwed into an upper internal thread of the pipe nut,
a lower bolt extends through the longitudinal member and the floor crossmember, and
an external thread of the lower bolt is screwed into a lower internal thread of the pipe nut.

2. The automotive hydrogen storage tank support system for the vehicle according to claim 1, wherein each side sill includes an inner side sill facing an interior of the vehicle, and an outer side sill facing an exterior of the vehicle, and
the pair of extension portions are joined to the inner side sills, respectively.

3. The automotive hydrogen storage tank support system according to claim 2, wherein each extension portion is joined to the corresponding inner side sill by a first mounting bolt being screwed into a first pipe nut that is fixed to the corresponding inner side sill.

4. The automotive hydrogen storage tank support system for the vehicle according to claim 3, wherein each side sill further includes a side sill reinforcement mounted in an inner cavity thereof, and at least a portion of the first pipe nut is embedded in the side sill reinforcement.

5. The automotive hydrogen storage tank support system for the vehicle according to claim 1,
wherein each floor longitudinal member extends in a longitudinal direction of the vehicle,
each one of the pair of longitudinal members is located closer to a longitudinal central axis of the vehicle than a corresponding one of the pair of floor longitudinal members, and
each one of the pair of floor longitudinal members is located closer to the longitudinal central axis of the vehicle than a corresponding one of the pair of side sills.

6. The automotive hydrogen storage tank support system for the vehicle according to claim 1, wherein each longitudinal member further includes a mounting bracket extending toward a corresponding floor longitudinal member, and
the mounting bracket is joined to the corresponding floor longitudinal member.

7. The automotive hydrogen storage tank support system for the vehicle according to claim 6, wherein the mounting bracket is joined to the floor longitudinal member by a second mounting bolt being screwed into a second pipe nut that is mounted in an inner cavity of the floor longitudinal member.

8. The automotive hydrogen storage tank support system for the vehicle according to claim 5,
wherein each longitudinal member is vertically aligned with a corresponding seat slide rail of the plurality of seat slide rails.

9. The automotive hydrogen storage tank support system for the vehicle according to claim 1, wherein the plurality of transverse members are aligned with some of the plurality of floor crossmembers.

10. The automotive hydrogen storage tank support system for the vehicle according to claim 1, further comprising a pair of center pillars mounted on lateral edges of the floor, respectively,
wherein at least one transverse member among the plurality of transverse members is aligned with the pair of center pillars.

11. The automotive hydrogen storage tank support system for the vehicle according to claim 1, wherein the hydrogen storage tank has a pair of mounting necks disposed on opposite end portions thereof,
each longitudinal member has a support block configured to support a corresponding end portion of the hydrogen storage tank, and
each support block has a cavity in which a corresponding mounting neck of the hydrogen storage tank is received.

12. The automotive hydrogen storage tank support system for the vehicle according to claim 1, wherein the plurality of transverse members are connected to the pair of longitudinal members through a plurality of vertical members, and
each vertical member extends in a height direction of the vehicle.

13. The automotive hydrogen storage tank support system for the vehicle according to claim 1, wherein the plurality of transverse members include a first front transverse member which is closest to a front end of the vehicle, a second front transverse member which is spaced apart from the first front transverse member toward the rear of the vehicle, a first rear transverse member which is spaced apart from the second front transverse member toward the rear of the vehicle, and a second rear transverse member which is spaced apart from the first rear transverse member toward the rear of the vehicle.

14. The automotive hydrogen storage tank support system for the vehicle according to claim 13, wherein the first front transverse member is connected to the pair of longitudinal members through a pair of first front vertical members,
the second front transverse member is connected to the pair of longitudinal members through a pair of second front vertical members,
the first rear transverse member is connected to the pair of longitudinal members through a pair of first rear vertical members, and
the second rear transverse member is connected to the pair of longitudinal members through a pair of second rear vertical members.

* * * * *